UNITED STATES PATENT OFFICE.

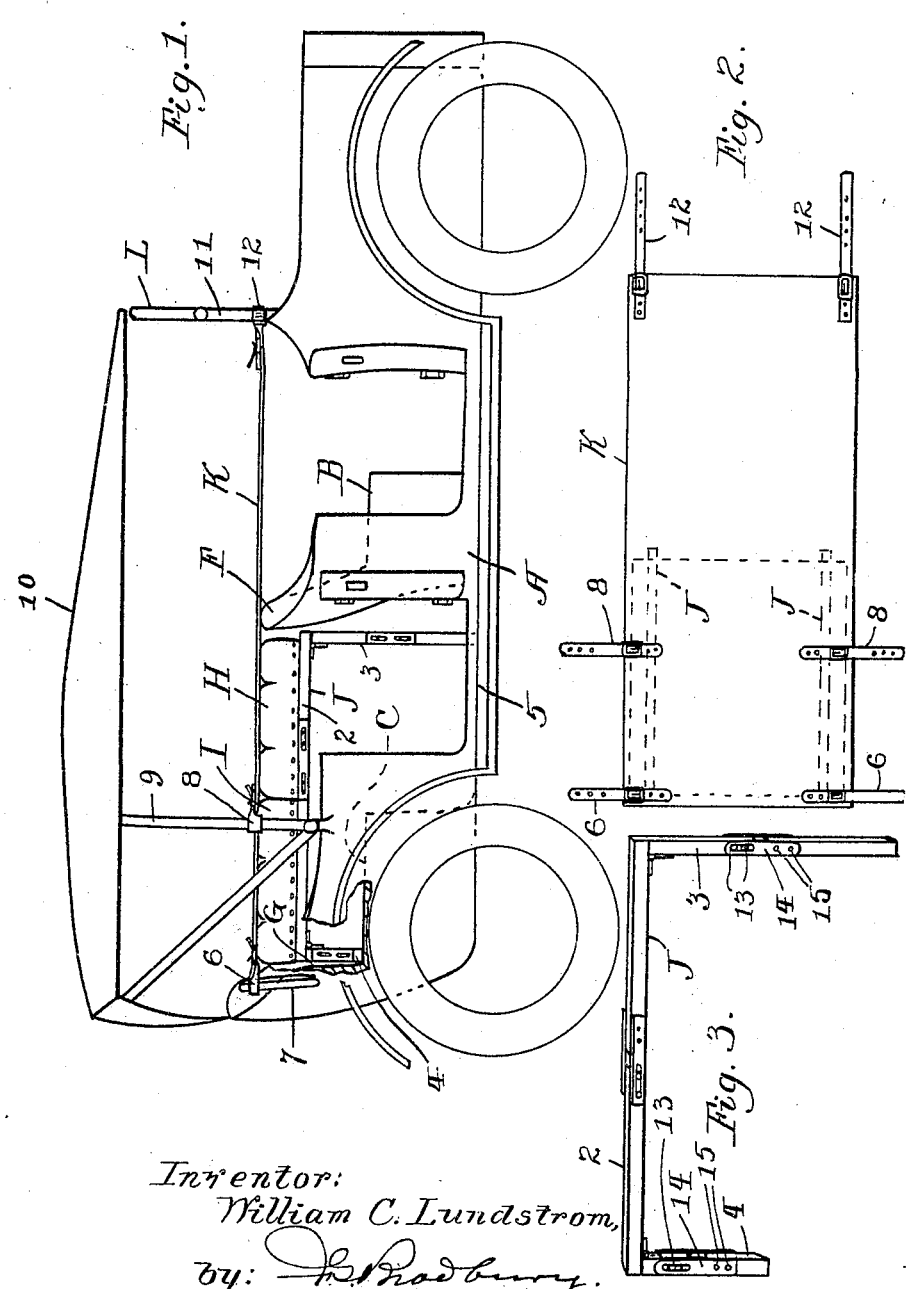

WILLIAM C. LUNDSTROM, OF MINNEAPOLIS, MINNESOTA.

BED FOR AUTOMOBILES.

1,375,100.　　　　　Specification of Letters Patent.　　Patented Apr. 19, 1921.

Application filed August 7, 1918. Serial No. 248,753.

*To all whom it may concern:*

Be it known that I, WILLIAM C. LUNDSTROM, a citizen of the United States, residing at 409 31st Ave. north, Minneapolis, in the county of Hennepin and State of Minnesota, have invented a new and useful Improvement in Beds for Automobiles, of which the following is a specification.

The object of this invention is to provide a bed for use in automobiles. The invention is especially adapted for constructing a temporary bed for the use of campers or in the event it becomes desirable in cases of emergency to provide a bed in an automobile of the usual open pleasure type.

A further object is to provide a bed of the character stated, which is simple in construction and inexpensive and effective in use. With these and other objects my invention comprises the features of construction and combination of parts hereinafter more particularly described and claimed.

In the accompanying drawing forming part of this specification, Figure 1 is a side elevation of an automobile showing my improved bed in operative position therein, the side curtains being omitted and the doors open for more clearly disclosing the invention; Fig. 2 is a plan of my improved bed removed from the automobile the position the cushions and folding supports assume being shown in broken lines, and Fig. 3 is a perspective of one of the folding supports.

In the accompanying drawing let A indicate an automobile body of the usual open pleasure type, in which are the front and back seats B and C having the usual seat backs F and G. In constructing my improved bed in the automobile when desired, the front and back spring seat cushions H and I are removed from their usual places and two or more folding supports J of similar construction are placed in the back portion of the automobile. Each of these folding supports is provided with a horizontal supporting bar 2, a vertical front leg 3 and a vertical back leg 4. The front leg is placed with its lower end resting on the floor 5 of the automobile adjacent to the back of the front seat and the back leg is placed with its lower end resting on the floor of the back seat, while the supporting bar 2 extends longitudinally. Two or more of these supporting elements are arranged in parallel relation in the manner as stated and the seat cushions H and I are placed crosswise upon the supporting bars 2 as illustrated in Fig. 1, thus substantially filling the space between the backs of the front and back seats. The supporting elements are arranged at a suitable height, so that the upper surfaces of the front and back cushions H and I lie substantially level with the upper edge of the back of the front seat, thus forming a spring bed supporting surface lying substantially flush or level with the back of the front seat. Arranged over the surface of the cushions and extending forwardly across the space above the front seat is a bed K substantially the width inside the seats of the automobile and of length extending from the back of the back seat to the wind shield L at the front end of the automobile. The flexible bed is made out of canvas or other suitable flexible material and is fastened in taut condition in said position by a pair of straps 6 to the cover clamps 7 at the rear end of the automobile, by a pair of straps 8 to the side bars 9 of the top 10 and by a pair of straps 12 to the sides 11 of the frame work of the wind shield at the front end. Thus a flexible spring bed can easily and quickly be produced whenever desired inside of the automobile, the surface of the bed being comparatively low and not extending a considerable distance above the back of the front seat as heretofore.

The supports J may have their longitudinal members 2 and supporting legs 3 and 4 made extensible when desired, each of said elements being constructed in longitudinal pairs of sections extensibly fastened together by means of side plates 14 screw and slot connections 13 and rivets 15. By this construction the supports may be used in machines of different dimensions, the supports being adjustable in height and length by the construction described. The parts 7, 9 and 11 to which the flexible bed is secured in taut condition may be any other of the parts of the body of the automobile than shown and which are conveniently accessible for that purpose on the automobile.

When it is desired to remove the bed, the flexible bed member K is unstrapped from the parts to which it is fastened when in use, and can be folded into a small compact parcel convenient for carrying in a minimum of space. The seat cushions are next removed and the supports J folded and packed away. The seat cushions are then replaced in position upon the seats for use. This operation of removing the bed may be accomplished in a short space of time. The apparatus described is exceedingly simple and inexpensive and provides a comfortable bed lying low in the automobile leaving a maximum amount of head room above the bed and below the cover of the automobile. The side curtains may be employed in the usual manner to form a tight and secure closure and the space below the bed may be utilized for storage purposes.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claim.

Having described my invention, what I claim as new and desire to protect by Letters Patent is:

In combination with an automobile body provided with front and back seats having seat backs and removable seat cushions, a flexible bed stretched horizontally substantially the full length of the body lying under the cover in substantially a horizontal plane over the back and front seats and closely over the upper edge of the back of said front seat, means for detachably fastening said bed in said outstretched condition at its ends and sides to parts of said body, and a plurality of unconnected foldable frames each having a front leg adapted to rest on the floor of the body in front of the back seat, a back leg adapted to rest on the back seat and a supporting top member hinged to said legs and supported in substantially horizontal and longitudinal position at a distance below said flexible bed and adapted to sustain the seat cushions closely between the back of the front and back seats with their upper surfaces lying substantially even in height with the top of the back of the front seat and to yieldingly support the flexible bed in said horizontal plane.

In testimony whereof I have signed my name to this specification.

WILLIAM C. LUNDSTROM.